Sept. 11, 1956  W. M. REESE  2,762,392
DIFFERENTIAL PRESSURE RESPONSIVE BELLOWS DEVICE
Filed Dec. 3, 1952  2 Sheets-Sheet 1

INVENTOR
William M. Reese
BY
ATTORNEY

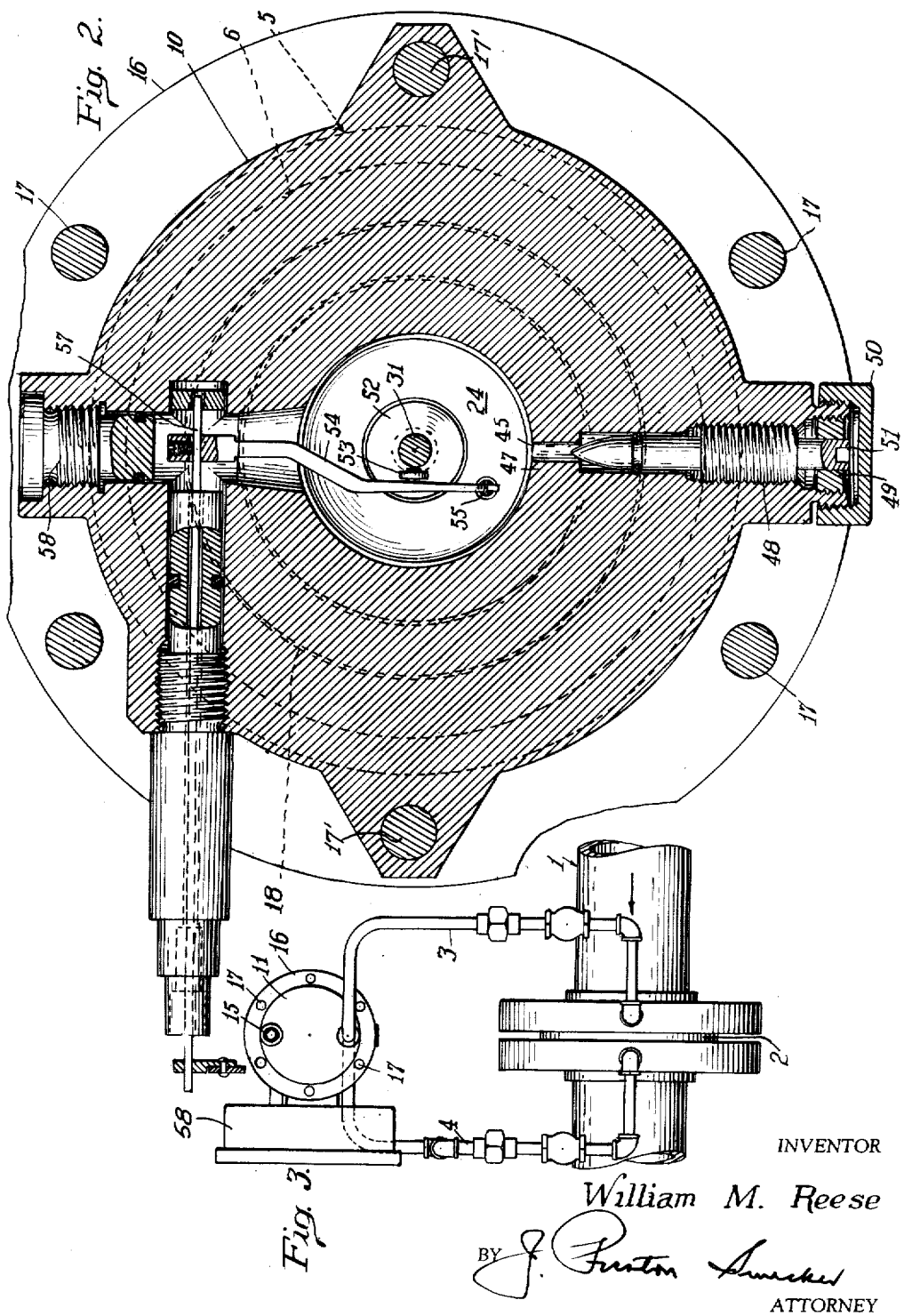

United States Patent Office 2,762,392
Patented Sept. 11, 1956

2,762,392

DIFFERENTIAL PRESSURE RESPONSIVE BELLOWS DEVICE

William M. Reese, Odessa, Tex., assignor to Industrial Instrument Corporation, Odessa, Tex., a corporation of Texas Application December 3, 1952, Serial No. 323,885

10 Claims. (Cl. 137—780)

This invention relates to differential pressure responsive devices of the character used for measuring pressures in different environments such, for instance, as the drop in pressure through an orifice plate in a flow line, although the device is not limited to such use.

Mercury meters have been used for measuring pressure differentials for many years but were subject to many objections in service. Attempts have been made to replace such mercury meters with bellows type meters and, while the latter overcame some of the difficulties encountered with mercury type meters, the bellows type meters used heretofore were objectionable because of inaccuracy of indication of pressure differentials, difficulty in changing the rate of calibration, complexity and expensiveness of construction, etc.

One object of the invention is to overcome these objections to bellows type differential pressure responsive devices, and to improve the construction thereof to make these practical and accurate in manufacture and use.

Another object of the invention is to provide for increasing the capacity or displacement of the fluid unit, providing for greater calibration travel and eliminating errors due to the pump effect of pulsating pressures.

Still another object of the invention is to provide for a free floating high pressure bellows which will not affect the calibration of the device, but will act as an effective temperature compensator over a wide range. Errors due to sudden pressure surges which may distort the bellows momentarily do not affect the accuracy of the meter recording.

A still further object of the invention is to eliminate errors in the transmission through the torque tube to the pin or indicator mechanism due to hysteresis and fatigue. The manner in which motion is transmitted to the recorder makes it possible for me to record differentials as low as five inches of water, whereas other instruments can be used only for recording differentials as low as twenty inches of water.

Still another object of the invention is to provide an improved dampener for pressure differentials which can be easily and quickly adjusted to secure the desired dampening effect and which will act to control surges or flow from one side to the other of the liquid in the device.

These objects may be accomplished according to one embodiment of the invention by providing separate bellows located within a housing and connected together through a passageway therebetween controlled by respective high and low pressure valves. The valves are both controlled from the low pressure bellows, free of the high pressure bellows so as not to be moved by the latter. Therefore, the high pressure bellows does not affect the calibration. It acts as an effective temperature compensator over a wider range, and errors due to sudden pressure surges which may distort the bellows momentarily do not affect the accuracy of the meter recording. It is possible to use a larger bellows than has been provided in other devices of this general type which gives greater displacement, thereby increasing the drive power and the total calibrated travel, eliminating errors due to the pump effect of pulsating pressures, especially when the dampener is provided as a by-pass valve.

The construction involves a center housing or plate provided with an opening therethrough for the valve stem of the high and low pressure valves that are connected together and with the low pressure bellows, without connection with the high pressure bellows. Provision is made for proper control and guiding of the stem to insure accurate movement thereof. A floating dampener restriction ring mounted on the stem limits the flow through the axial passageway and provision is made for a by-pass passage controlled by a pulsation dampener valve which may be adjusted manually from a point externally of the instrument. The restriction ring is intended to restrict the greater part of the fluid flowing from one bellows to the other, forcing the fluid around and through the by-pass passage which is adjustable by the valve therein, thus providing greater control over the operation of the instrument. The construction and assembly of the instrument makes it possible to use a much larger bellows than has been provided heretofore which contains much more sealing fluid, giving greater displacement, which increases the drive power and travel, and thus eliminates errors due to the pump effect of pulsating pressures when the dampener is used.

This embodiment of the invention is illustrated in the accompanying drawings in which:

Fig. 2 is a cross section therethrough on the line 2—2 in Fig. 1; and

Fig. 3 is a diagrammatic view showing the connection of the differential pressure responsive device in a pipe line.

Figure 1:
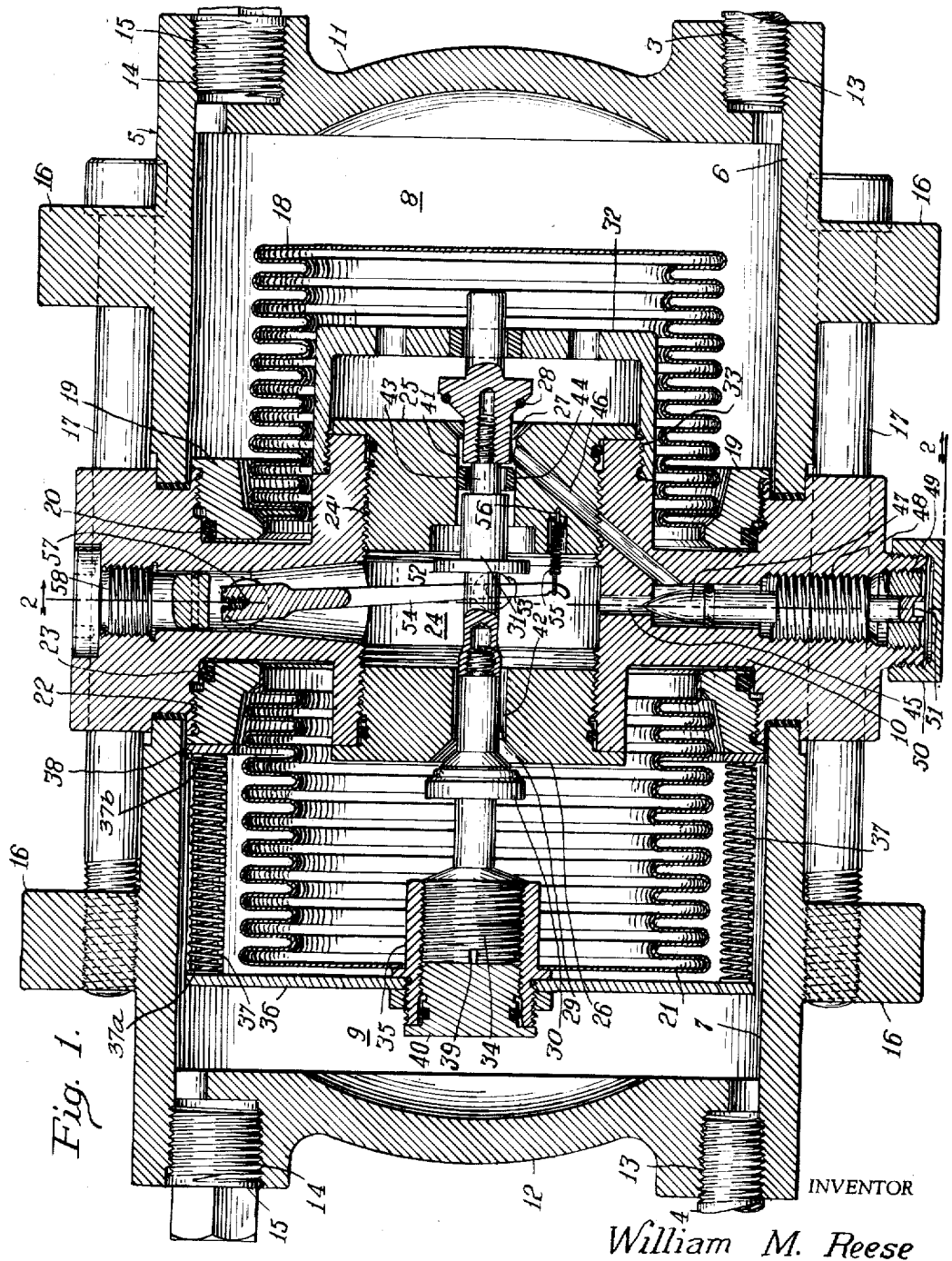
Fig. 1 is a longitudinal section through the differential pressure responsive device embodying this invention.

While the invention is adapted for many uses as a differential pressure responsive device, for measuring, controlling or indicating pressure differentials, one embodiment of the invention is illustrated in Fig. 3 as a differential flow meter to measure the drop in pressure through an orifice plate in a flow line. A typical gas or liquid flow line is designated generally at 1 which is provided with an orifice plate therein, generally indicated at 2, through which the liquid or gas flows in the line in the direction indicated by the arrow in Fig. 3. Connected with the flow line 1 on opposite sides of the orifice plate 2 are pipes 3 and 4, respectively, which extend to the differential pressure responsive device constituting this invention, being connected, respectively, with the high and low pressure chambers thereof.

The embodiment of this device which is illustrated in the drawings comprises a housing generally indicated at 5, the construction of which is shown in Fig. 1. The housing 5 includes a high pressure cylinder or body 6 and a corresponding low pressure cylinder or body 7 arranged in axial alignment with each other and defining, respectively, high and low pressure chambers 8 and 9. The chambers 8 and 9 are separated from each other by a center plate 10.

The housing cylinder or body 6 is closed at its outer end by a head 11, while the cylinder or body 7 is likewise closed at its outer end by a head 12. The heads 11 and 12 are shown as formed in one integral piece with the cylinders or bodies 6 and 7, respectively, although they may be separate therefrom if desired and secured rigidly thereto. Each of the heads 11 and 12 is provided with tapped connector openings 13 and 14 of different diameters as, for instance, one-quarter inch and one-half inch, respectively. One set of the openings is connected with the pipes 3 and 4, while the other set is closed by plugs 15. Either set of tapped connector openings may be used according to the size of pipes to be connected therewith.

The aligned cylinders or bodies 6 and 7 are provided with oppositely disposed flanges or lugs 16 for connecting together the cylinders or bodies 6 and 7 through cap screws or tie bolts 17. Several such tie bolts may be used as required. Guide posts 17' fixed in lugs on the center plate 10 enter openings in the flanges 16 to aid in alignment of the parts.

Mounted within the high pressure chamber 8 is a bellows 18 closed at its outer end and exposed externally to the pressure within the high pressure chamber 8. The inner end of the bellows 18 is sealed to a nut or mounting ring 19 screw threaded into a countersunk or recessed portion in the adjacent lateral face of the center plate 10. A sealing ring is shown at 20, preferably an O-ring, which effects a complete sealing from the inside of the bellows 18 around the periphery of the nut 19 into the chamber 8.

Mounted in the low pressure chamber 9 is a bellows 21, the periphery of which is exposed to the pressure in the chamber 9. The inner end of the bellows 21 is sealed to a nut or mounting ring 22 screw threaded into a countersunk or recessed portion of the center plate 10 and provided with a peripheral seal at 23, corresponding with the connection at 19—20 described above.

The bellows 18 and 21 preferably have substantially equal effective areas and are both exposed externally to the liquid or gas within the chambers 8 and 9. The construction herein set forth provides for the use of larger bellows requiring several times the sealing fluid contained therein, which gives greater displacement with increased drive power. This provides several times the total calibrated travel as compared with other bellows heretofore used in instruments of this general type. The bellows 18 and 21 are filled with a suitable liquid that is adapted to flow back and forth therebetween in response to variations in pressure in the chambers 8 and 9.

The center plate 10 is provided with an axial passageway 24' therethrough, formed with a cored out or center chamber 24. The axial passageway is closed by plugs 25 and 26 at opposite ends thereof, preferably screw threaded into opposite sides of center plate 10 and sealed thereto. The plug 25 is provided with a valve seat 27 in position to be engaged by a high pressure valve 28. The plug 26 is provided with a valve seat 29 in position to be engaged by a low pressure valve 30. Axial passageways 41 and 42 are provided from the seats 27 and 29 through the plugs 25 and 26 into the cored chamber 24.

The valves 28, 30 are connected together by a valve stem section 31 shown as having screw threaded connection with the respective valve members and coacting with the latter to form a valve assembly which is elongated and unitary.

One end of the valve assembly is slidably mounted in a valve stem guide cap 32 secured at 33 on a side portion of the center plate 10 around the plug 25. The cap 32 is perforated, axially in the form shown, to permit freedom of passage of fluid from the valved passageway into the bellows 18.

The opposite end of the valve assembly has a head portion 34 screw threaded in a mounting sleeve or bushing 35 secured rigidly on a plate 36 supported and pressed outward by calibrating springs 37 spaced at intervals around the periphery of the plate 36. The springs 37 are interposed between the plate 36 and a slip ring 38, which latter is pressed against the outer face of the nut 22. The calibrating springs 37 may be secured by screws or otherwise 37a to the plate 36 and 37b to the ring 38. The plate 36 and the ring 38 hold the springs 37 in proper positions relative to each other in a unitary assembly and permit unitary replacement and circumferential shifting of the said spring assembly relative to the mounting ring 22 in applying or replacing the spring assembly. The calibrated springs 37 are spaced equally around the bellows 21 and thereby distribute the spring load about the bellows with the springs in place.

The head 34 is provided with an adjustment slot 39 in the outer end thereof adapted to receive a screw driver for axial adjustment of the valve assembly relative to the sleeve 35. A plug 40 is threaded into the outer end of the sleeve 35 to close the latter. The outer end of the bellows 21 is sealed to the periphery of the sleeve 35, and secured rigidly thereto.

The axial passageway through the plug 25 is designated at 41 and is substantially cylindrical, extending from the valve seat 27 into the chamber 24 that is formed in the center plate 10. The valve stem 31 extends through this passageway 41, and the bellows 18 and 21 communicate therethrough and through a corresponding aligned passageway 42 in the plug 26.

The valve stem 31 has a reduced section 43 adjacent the point of connection with the valve 28. A floating restriction ring 44 surrounds the section 43 and is sleeved thereon in loose relation with respect to the valve stem so as to have some freedom of axial as well as radial movement with respect to the valve stem. The ring 44 has an arcuate periphery in cross section, as shown in Fig. 1, and is adapted to engage the inner surface of the passageway 41 and partially close the latter against free flow of liquid therethrough, or at least restrict the flow through said passage. At the same time the ring 44 does not prevent transverse deflection of the valve stem in its axial movement.

The center plate 10 is provided with a by-pass passage from the chamber 24 therein around the floating restriction ring 44. This by-pass passage is formed by a radial passage 45 in the center plate 10 that communicates with an angular passage 46 that extends from a portion of the passage 45 laterally through the plate 10 and through a portion of the plug 25 to the outer end of the axial passage 41 in the plug at a point adjacent the valve seat 27. These passages 45 and 46, therefore, will allow the circulation of liquid around the restriction ring 44.

A pulsation dampener restriction valve is shown at 47 extending axially of the passage 45 in position to seat against an end portion thereof intermediate the passage 45 and the passage 46. The valve 47 is constructed as a needle valve and controls communication through the by-pass 45—46 upon axial adjustment relative to the passage 45. The valve 47 is adjustably mounted at 48 in the plate 10 and is held in place by a nut 49 and is enclosed by a cap 50. The extreme outer end of the valve 47 may be provided with a screw driver slot 51 to be engaged for adjustment thereof when desired.

The restriction ring 44 is intended to restrict the greater part of the liquid flow from one bellows to the other, forcing the liquid around through the by-pass 45—46. The latter is controlled by the pulsation dampener valve 47 that may be adjusted to restrict the flow and thus retard surges in movement of fluid from one bellows to the other, thereby dampening the operation of the device in response to any sudden increase of pressure. The adjustment of the pulsation dampener valve 47 will permit normal flow from one bellows to the other through the by-pass but retard excessive flows due to greatly increased pressures.

The valve stem 31 is provided with a disk 52 thereon within the chamber 24 against which a roller 53 bears at one side of the valve stem. The roller 53 is carried by an arm 54 that extends downward in the chamber 24 beside the valve stem 31. The lower end of the arm 54 has a coiled spring 55 connected therewith at one end of the spring, the opposite end being anchored to a pin 56 on the plug 25.

The arm 54 extends upwardly to an instrument connection generally indicated at 57, that extends laterally of the housing 5 and preferably is provided with a non-freezing bearing, as described in my application Serial No. 210,132, filed February 9, 1951, now Patent No. 2,712,968, granted July 12, 1955.

The center plate 10 is provided with an opening in the top thereof into the chamber 24 normally closed by a seal plug 58 screw threaded into the opening.

The operation of this device is described in connection with a flow line indicated at 1 in Fig. 3, with a pressure fluid flowing therethrough in the direction indicated by the arrow. Usually an orifice plate is provided in such a flow line, and as the fluid passes through the orifice plate, a reduction in pressure takes place. This device is connected through the pipes 3 and 4 with the high and low pressure sides of such orifice plate, whereby the relative pressures will be transmitted to this device.

The bellows 18 and 21, together with the means of communication between the interiors of said bellows, are filled with an incompressible liquid. This liquid is in the form of a liquid column that extends from the bellows 18 through the passageways 45 and 46, the center chamber 24 in the plate 10, and the passageway 42 into the bellows 21. This means of communication thus provided is controlled by the valves 28 and 30, which valves and their connecting valve stem 31 are controlled by the connection provided through the head 34 and bushing 35 with the closed end of the bellows 21.

It will be noted that the valves 28 and 30 are not connected with the bellows 18, but the latter is free thereof so that the device does not react to sudden pressure surges in the line 1, which may distort the bellows 18 momentarily. The slow transmission of this distorting action through the several passageways mentioned will not cause a reaction of the device, and particularly the meter connected therewith, to such momentary changes in pressure at the high pressure side in the chamber 18. Nevertheless, when a definite change in pressure takes place in the line 1 and is transmitted through the conduit 3 to the high pressure chamber 8, this increase in pressure will act through the bellows 18 to force liquid therefrom through the passageway described as including the passages 45 and 46, the center chamber 24, and the passage 42, into the low pressure bellows 21. If this be a great surge of pressure, maintained sufficiently long, the expansion of the bellows 21 thereby will tend to close the valve 28, thus preventing rupturing of the bellows.

Normally the bellows 18 and 21 are maintained in a relatively equalized condition subject to variations in pressure. The bellows 21 is compressed by the stabilizing spring 37 interposed between the periphery of the plate 36, which latter acts as a spider to hold these springs in place, and the slip ring 38. The latter is free of the nut 22 which surrounds the periphery of the bellows 21 and acts as a mounting ring therefor so as to hold the springs in assembly around the bellows and makes it possible for these to be replaced readily when changes in calibration are desired, without the necessity for removing or changing the bellows 21. This disposition of the springs also distributes the spring load about the bellows when the springs are in place, and yet the entire spring assembly can be replaced readily.

As the bellows 21 is moved under variations in pressure, such movement of the closed end of the bellows is transmitted through the valve stem 31 to the arm 54, which in turn may be connected to a suitable indicating arm, or recorder, through the torque tube or transmission line generally indicated at 57. The meter or other instrument connected therewith is indicated at 58 in Fig. 3.

From the above description it will be apparent that this construction has material advantages over bellows type differential pressure responsive devices, especially in providing for larger bellows which gives greater displacement and eliminates errors due to the pump effect of pulsating pressures when the dampener is used as provided herein. The high pressure bellows is a free floating unit and therefore does not act directly through a connection with the valve means to affect the calibration. It acts as an efficient temperature compensator over a wide range, and errors due to sudden pressure surges which may distort the bellows momentarily do not affect the accuracy of the meter recording. The bellows travel is transmitted to the pin mechanism or indicator by a non-freezing bearing which eliminates errors common to the torque tube due to hysteresis and fatigue. The bearing also enables me to record differentials much lower than has been possible heretofore.

While the invention has been illustrated and described in one embodiment, it is recognized that variations and changes may be made therein without departing from the invention as set forth in the claims.

I claim:

1. A differential pressure responsive device comprising a housing, a center plate extending transversely of the housing and dividing the latter into separate high and low pressure chambers, a bellows in each of said chambers, each of the bellows having the inner end thereof secured to the center plate and the outer end free for flexing movement relative thereto, the center plate having a passageway therethrough providing communication between the interior of the bellows, high and low pressure valves controlling communication through said passageway, a valve stem rigidly connecting the valves together, a bushing fixed to the outer end of the low pressure bellows, means for adjustably securing the low pressure valve and valve stem to said bushing, said valve stem and high pressure valve being separate and independent from the high pressure bellows and movable relative thereto, and a guide cap secured to the center plate within the last-mentioned bellows having openings for the passage of fluid therethrough and having guide means therein spaced axially from the high pressure valve and slidably receiving the valve stem for guiding the movement thereof.

2. A differential pressure responsive device comprising a housing, a center plate extending transversely in the housing and dividing the housing into separate chambers, a bellows in each chamber and having the inner end thereof secured to the center plate and the outer end movable relative to the chamber, said center plate having a passageway therethrough providing communication between the bellows, a valve assembly including valves for controlling said communication through the passageway, a bushing fixed to the movable end of one of the bellows, said valve assembly having a head thereon adjustable axially in the bushing, a plate fixed to the bushing and extending laterally thereof over the end of one of the bellows, calibrating springs interposed between the periphery of said plate and a portion of the housing normally tending to move the plate and valve assembly relative thereto, said springs being spaced apart circumferentially at intervals around the periphery of the last-mentioned bellows and distributing the spring load about said bellows with the springs in place.

3. A differential pressure responsive device comprising a housing, a center plate extending transversely of the housing dividing the housing into separate chambers, a bellows in each chamber, said center plate having a passageway therethrough for communication between the bellows, mounting rings secured in the respective chambers on opposite sides of the center plate and having the inner ends of the bellows secured thereto, a valve assembly including valves for controlling communication through the passageway, means for connecting the valve stem with one of the bellows, a calibrating spring plate fixed to the valve stem and extending outwardly thereof over the end of one of the bellows beyond the periphery thereof, calibrating springs interposed between the periphery of the last mentioned plate and the adjacent mounting ring, said springs being spaced apart circumferentially at intervals around the periphery of the last-mentioned bellows, and a slip ring bearing against the last-mentioned mounting ring between the calibrating springs and said mounting ring.

4. A differential pressure responsive device comprising a housing, means dividing the housing into separate chambers, a bellows in each chamber, means forming a fluid column from the interior of one bellows into the other bellows, means connected to a bellows for controlling the rate of flow of said fluid column upon expanding and collapsing movements of the bellows, each of the bellows having a movable end, a mounting plate secured to the movable end of one of the bellows, and calibrating springs connected with said mounting plate and with the housing and spaced apart circumferentially at intervals around the periphery of said last-mentioned bellows, the spacing of said springs distributing the spring load about said bellows with the springs in place.

5. A differential pressure responsive device comprising a housing, means dividing the housing into separate chambers, a bellows in each chamber, means forming a fluid column from the interior of one bellows into the other bellows, means connected to a bellows for controlling the rate of flow of said fluid column upon expanding and collapsing movements of the bellows, each of the bellows having a movable end, a mounting plate secured to the movable end of one of the bellows and extending radially beyond the periphery thereof, and calibrating springs spaced apart circumferentially at intervals around the periphery of the last-mentioned bellows and interposed between the radially projecting portion of said plate and a portion of the housing and normally tending to move one end of the last-mentioned bellows in one direction, the spacing of said springs distributing the spring load about said bellows with the springs in place, and a mounting ring in the housing externally of the last-mentioned bellows and having the other end of said last-mentioned bellows secured thereto.

6. A differential pressure responsive device comprising a housing, a center plate therein dividing the housing into separate high and low-pressure chambers, said center plate having an internal chamber therein, a bellows in each of said pressure chambers, a passage from said internal chamber into the low-pressure bellows, valve means connected only with the low-pressure bellows for controlling said passage, said valve means being separate from the high-pressure bellows and said high-pressure bellows being movable relative thereto, whereby sudden pressure surges will not be transmitted to the valve means to affect the accuracy of the device, and means of communication from the internal chamber into the high pressure bellows.

7. A differential pressure responsive device comprising a housing, a center plate therein dividing the housing into separate high and low pressure chambers, said center plate having an interval chamber therein, a bellows in each of said pressure chambers, a passage from said internal chamber into the low-pressure bellows, valve means connected only with the low-pressure bellows for controlling said passage, said valve means being separate from the high-pressure bellows and said high-pressure bellows being movable relative thereto, whereby sudden pressure surges will not be transmitted to the valve means to affect the accuracy of the device, means of communication from the internal chamber into the high-pressure bellows, and spring means acting only on the low-pressure bellows with the high-pressure bellows flexing only in response to the relative fluid pressures on opposite sides of said high-pressure bellows.

8. A differential pressure responsive device comprising a housing, a center plate therein dividing the housing into separate chambers, said center plate having an opening therethrough, plugs detachably mounted in opposite sides of said opening in the center plate, a mounting ring detachably mounted on the center plate at each opposite side thereof and surrounding one of the plugs separate from the plug, a bellows in each of said chambers and secured at its periphery to one of said mounting rings, and means of communication between the bellows.

9. A differential pressure responsive device comprising a housing, a center plate therein dividing the housing into separate chambers, said center plate having an opening therethrough, plugs detachably mounted in opposite sides of said opening in the center plate, a mounting ring detachably mounted on the center plate at each opposite side thereof and surrounding one of the plugs, a bellows in each of said chambers and secured to one of said mounting rings at the inner edge of said ring, means of communication between the bellows, a plate secured to the opposite end of one of the bellows, and a plurality of coiled springs extending lengthwise of the axis of the last-mentioned bellows and spaced apart around the bellows, said springs being connected at opposite ends with the plate and adjacent mounting ring, the spacing of the springs distributing the spring load about said bellows with the springs in place.

10. A differential pressure responsive device comprising a housing, a center plate extending transversely in the housing and dividing the housing into separate chambers, a bellows in each chamber, mounting rings at opposite sides of the center plate and having detachable connections with said center plate, each of the bellows having the inner end thereof telescoped into one of the mounting rings and fixed thereto at the inner edge of said mounting ring, each of said bellows having the outer end thereof movable in the respective chamber, means of communication between the interiors of the bellows, and valve means for controlling communication through said means between the bellows.

References Cited in the file of this patent

UNITED STATES PATENTS

| | | |
|---|---|---|
| 1,698,164 | Mallory | Jan. 8, 1929 |
| 1,870,904 | Giesler | Aug. 9, 1932 |
| 1,874,704 | Johnson | Aug. 30, 1932 |
| 2,298,150 | Newton | Oct. 6, 1942 |
| 2,320,969 | Kromer et al. | June 1, 1943 |
| 2,391,808 | Vincent | Dec. 25, 1945 |
| 2,418,536 | Wood | Apr. 8, 1947 |
| 2,600,271 | Schaevitz | June 10, 1952 |
| 2,630,129 | Holmes | Mar. 3, 1953 |
| 2,632,474 | Jones | Mar. 24, 1953 |
| 2,635,639 | Eggenberger | Apr. 21, 1953 |
| 2,659,390 | MacLea | Nov. 17, 1953 |

FOREIGN PATENTS

| | | |
|---|---|---|
| 345,415 | Great Britain | Mar. 26, 1931 |

U. S. DEPARTMENT OF COMMERCE
PATENT OFFICE

CERTIFICATE OF CORRECTION

Patent No. 2,762,392     William M. Reese        September 11, 1956

It is hereby certified that error appears in the printed specification of the above numbered patent requiring correction and that the said Letters Patent should read as corrected below.

Column 7, line 52, for "interval" read -- internal --.

Signed and sealed this 17th day of June 1958.

(SEAL)
Attest:
KARL H. AXLINE

Attesting Officer

ROBERT C. WATSON
Commissioner of Patents